Oct. 18, 1932.   W. L. FLEISHER   1,883,665
AIR CONDITIONING UNIT
Filed March 22, 1929   2 Sheets-Sheet 1
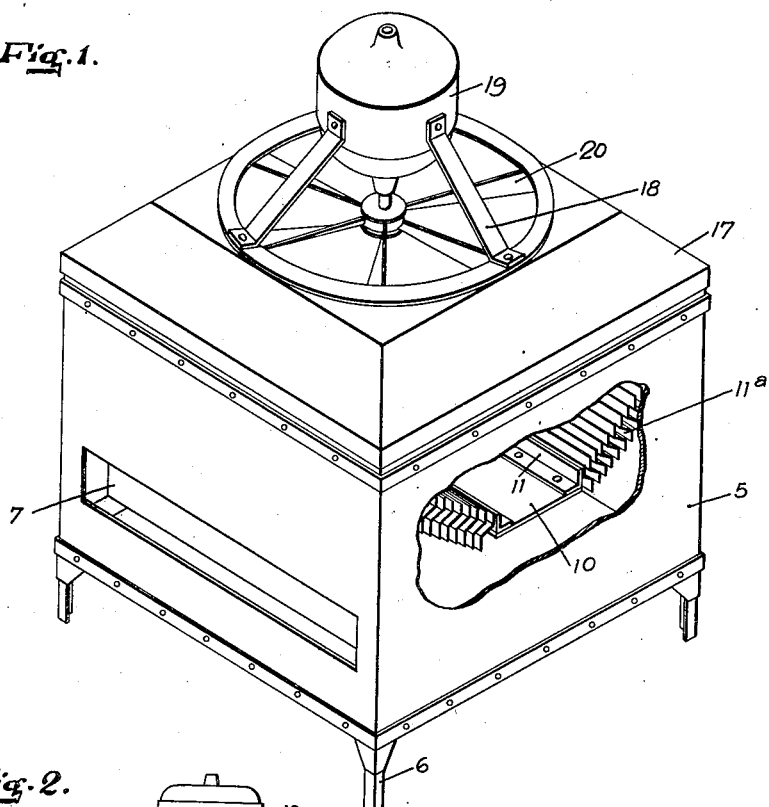
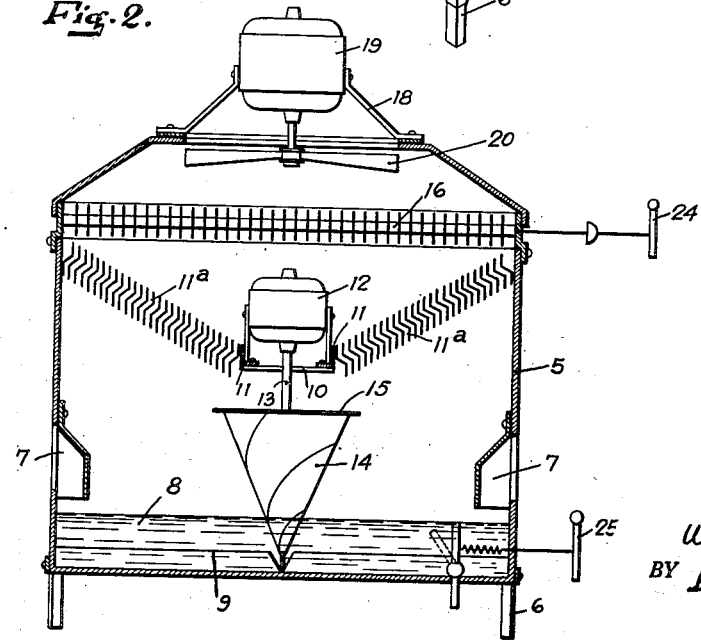

Oct. 18, 1932.  W. L. FLEISHER  1,883,665
AIR CONDITIONING UNIT
Filed March 22, 1929  2 Sheets-Sheet 2
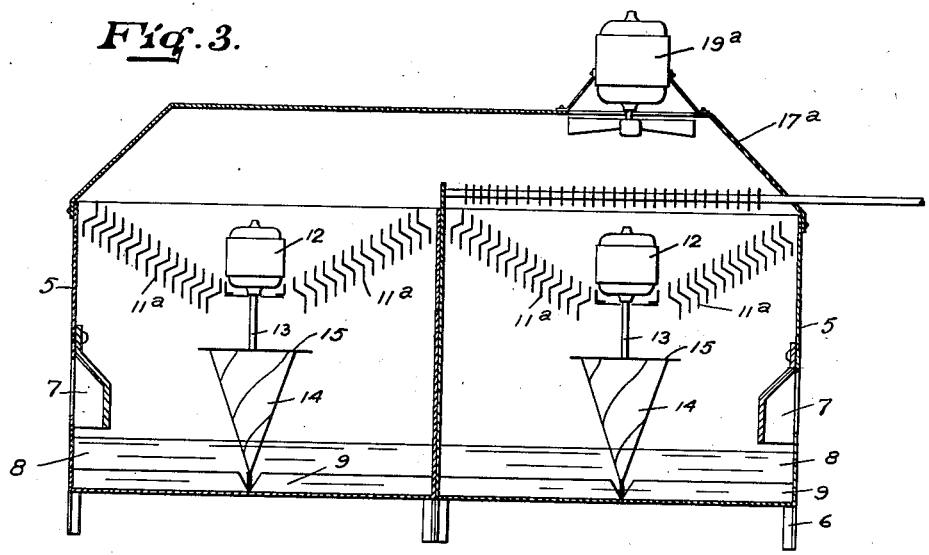
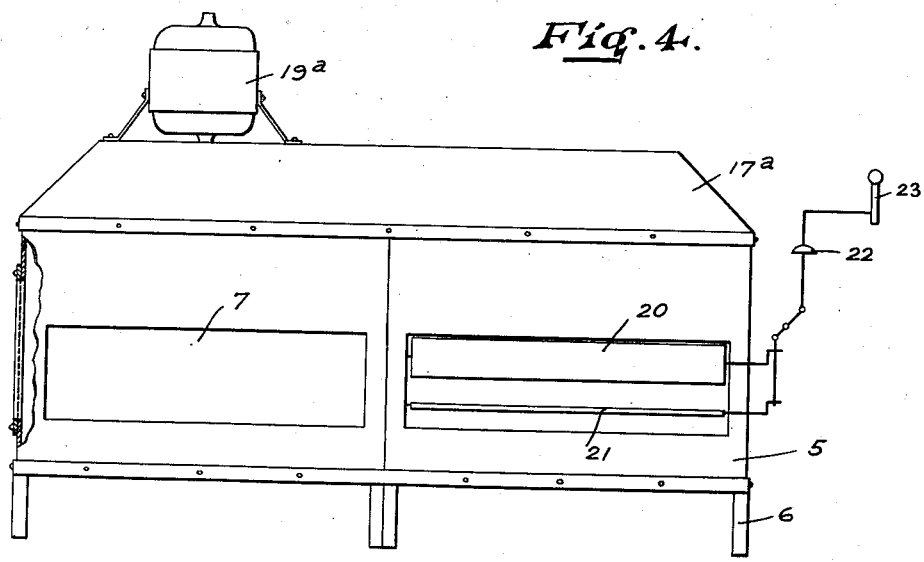
INVENTOR.
Walter L. Fleisher
BY Duell, Dunn & Anderson
ATTORNEYS.

Patented Oct. 18, 1932

1,883,665

UNITED STATES PATENT OFFICE

WALTER L. FLEISHER, OF NEW YORK, N. Y., ASSIGNOR TO THE COOLING & AIR CONDITIONING CORPORATION, OF NEW YORK, N. Y., A CORPORATION OF NEW YORK

AIR CONDITIONING UNIT

Application filed March 22, 1929. Serial No. 343,143.

This invention relates to air conditioning apparatus and more particularly to substantially portable units for producing and controlling desired temperature and relative humidity conditions.

An object of the invention is to provide a compact atmospheric conditioner unit which may be used alone or in groups for economically humidifying or dehumidifying, and adequately conditioning any given area in which the unit is positioned.

In the conditioning of buildings, such as auditoriums or theatres, where desired condition of temperature and humidity are preferably maintained substantially uniform throughout the enclosure, a central station air conditioning system may be used to advantage. The apparatus is permanently installed in one place, as in the basement, and by a series of shafts and ducts, distribution is effected throughout the area served. However, where it is desired to maintain a predetermined condition only in part of a given area, as in a certain room of a building, or where it is desired to condition air at intervals, as in certain industrial processes, or where different conditions must be produced in different places, as within different areas of a factory, or the like, requiring varying atmospheric conditions in carrying out various steps in manufacture, a central station is not only expensive but totally unsuited for the different demands it would be called upon to meet.

Applicant combines the advantages of a central station in a portable unit which may be used, if desired, as a central station, or which may produce certain conditions within one area of an enclosure, while a similar unit may produce different conditions in another area. The units may be designed to handle prescribed air volumes, and hence serve to maintain desired plenum conditions in the area wherein placed.

A feature of the invention resides in the independent arrangement of a fan and pump whereby the air volume drawn through the unit, and the volume and intensity of spray produced for humidification or dehumidification may be varied, or individually controlled, to meet different limitations of humidity, temperature and air volume. Thus, the wet bulb temperature and dew point of air sent through the unit may be controlled by obtaining different relations between the air speed and spray volume. The regulation of the dry bulb temperature of the discharged air may be effected by reheaters or recirculation of return air, in combination, if desired, with a control of spray water temperatures.

Another feature resides in the provision for combining a number of units in group formation, whereby humidification control may be centered in one unit, or certain of the units, whereas the other units may be employed for supplying recirculated air, thus controlling the final air volume, imparting reheating effect thereto and causing desired relative humidity reduction.

A further feature is provided for enabling outdoor and return air to be supplied the unit in varying proportions responsive to conditions within the area served. Central station economy may thus be obtained with the unit, under conditions requiring a percentage of outdoor air, or in a situation requiring differentiation between the dew-points existing within and without the conditioned zone.

Further features for controlling water levels in the units, for controlling heating means for the production of desired dry bulb and relative humidity conditions, and advantages in design, assembly, operation and application to meet varying needs, will be more apparent from the following description of the invention to be read in connection with the accompanying drawings, in which:

Figure 1 represents a perspective of one form of unit adapted to carry out the invention;

Fig. 2 is a cross-section of the unit shown in Fig. 1;

Fig. 3 shows a pair of units in combination, and

Fig. 4 illustrates an arrangement for controlling temperature and relative humidity under thermostatic control and by the use of recirculation.

Considering the drawings, similar designations referring to similar parts, numeral 5 represents an air conditioner unit made of any suitable casing material. The unit may be positioned on supports 6 or be directly positioned on any desirable supporting surface. The unit is portable and hence may be moved for conditioning different areas.

The body of the unit is necessarily designed to accommodate a predetermined volume of air drawn therethrough for conditioning. Entrance ports 7 are provided, as illustrated, on opposite sides of the unit and may be placed on as many of the sides as desired, depending upon the volume of air to be handled and the capacity of the unit.

The bottom of the unit forms a reservoir 8, which may be provided with baffles 9 to prevent splashing. Water or other liquid may be fed to the reservoir through any ordinary means, and the level controlled by a thermostatic device or otherwise. Member 10 is secured by angles 11 running between opposite sides of the device; and eliminators 11ª connect with the member and are disposed on each side thereof forming, in effect, a truss structure between opposite sides of the unit. The eliminators, as shown, tilt between the sides and the member 10, thus exposing a greater eliminator surface than would be the case if positioned horizontally.

Motor 12 is suitably positioned on member 10 and has a shaft 13 projecting through the member and attached to a vaporizer device 14. The vaporizer is preferably in the form of a cone, having rifling on its outer surface. The word cone is employed as a convenient designation of the vaporizer or pumping element, although in many instances it may be desirable to employ conoidal surfaces which are not true or simple cones, or it may be desirable to employ surfaces having varying pitch at different levels thereof and differently rifled surfaces, for different purposes. The upper or base end of said cone may terminate in a disk 15 of somewhat larger diameter than the base, whereby liquid flowing up the cone surface will meet with the obstructing horizontal underside of the disk and be thrown outwardly thereby. At the upper end of the casing may be removably positioned a bank of heaters 16. These may be of the electrical resistance type, or may be operated by steam, hot water, or other desired medium.

The top of the casing is enclosed by a hood 17 adapted to be removably positioned on the casing. Superposed on the hood is a holding frame 18 for supporting motor 19, which in turn operates fan 20. The blades of the fan are designed with a degree of pitch assuring a substantially outward or horizontal discharge of air from the hood rather than an upward discharge.

In the operation of the device, motor 12 is controlled independently of motor 19. Thus the rate of rotation of the cone is not necessarily related to that of the fan. Assuming that a certain volume of air is required to be handled, within the capacity of fan 20, the motor is set to operate at a corresponding speed. The cone is also actuated in accordance with the intensity and volume of spray desired, depending upon the degree of humidification or dehumidification required.

The air enters through intake ports 7, due to the suction of the fan, proceeds through the spray produced by the cone, passes upwardly through eliminators 11ª, where the entrained moisture is removed, proceeds through the heaters and then is discharged outwardly by the fan. The cone may be rotated at high speed without vibration, thereby insuring thoroughness of atomization. There is nothing to clog, and due to the rifling, it handles exceptionally large amounts of liquid. It may be made solid and hence operates silently, without resonating or vibrating as in the case of sheet metal.

In practice the units may be combined, and in addition to affording greater capacity, will also provide central station advantages without the use of auxiliary equipment. Thus in Fig. 3, two units are shown used in combination. Each has substantially the same equipment except that a single hood 17ª is used to enclose both. Motor 19ª is shown positioned over the unit at the right. The motor may, however, be positioned anywhere on the hood and hence create a suction in any position considered most desirable. In Fig. 3 the vaporizer element in the righthand unit is shown in operation, whereas the unit at the left is inoperative. The air drawn through the righthand unit will, therefore, be subject to the action of the spray and undergo humidification or dehumidification, depending upon its temperature and that of the spray. The treated air, however, will be mixed with untreated air drawn through the lefthand unit, and hence a mixture will be discharged of greater volume and of lower relative humidity than would be the case if only the treated air were employed. In essence, the air drawn through the lefthand humidifier is recirculated air which tempers the treated air and lowers its relative humidity, inasmuch as the treated air leaving the sprays is substantially saturated.

As a result, a unit is afforded in which the advantages of recirculation are incorporated. In Fig. 4 applicant goes further and provides dampers 20 and 21 whereby volumes of outside air and air from the area wherein the apparatus is positioned, may be intaken in controlled proportions. Damper 20 may be used for controlling a volume of air taken from outdoors by a duct not shown. Damper 21 regulates the volume of air taken from the area surrounding the unit. The dampers may be operated differentially, by compressed air, through the usual controlling medium including an actuating motor 22 operative responsive to a thermostat 23. Thus, if dampers 20 and 21 are connected differentially, one will open while the other closes, and the volumes drawn therethrough will change responsive to changing conditions in the area served, which are reflected by thermostat 23.

It is obvious that an arrangement akin to that of dampers 20 and 21 may be provided for supplying a mixture of air to be conditioned, or for providing a volume of air of desired constituency to mix with air already conditioned.

The units may be constructed so that the parts are removably interrelated so that for example, different heater sections may be added as desired, and the individual hoods removed whenever it is desired to place several units under a single hood. The heaters may be controlled automatically responsive to a dry bulb thermostat 24, as illustrated in Fig. 2; thus when conditions in the area require a higher temperature the heaters would be cut in and vice versa. Thus also the level in the reservoir at the bottom of the units could be controlled responsive to a wet bulb thermostat 25.

If it were desired to reduce the volume of spray, due to rising wet bulb conditions in the area, the thermostat would cause the level to be reduced, whereas, if the wet bulb temperature were too low, the thermostat 25 would cause a rise in the reservoir level. It is understood, of course, that the water temperature may be controlled in any desired way, and any refrigerated source could be employed to provide water at a desired low temperature.

Since certain changes may be made in the above structural combinations and arrangements of parts, and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An air conditioning unit having an inlet and an outlet, means for drawing air through the inlet and discharging it through the outlet, an atomizer, a bracing member within said unit, a truss formed by eliminators on opposite sides of said member, said bracing member supporting a motor for driving the atomizer.

2. An air conditioning unit having a casing, a vaporizer within the casing, a series of eliminators in the casing, means in combination with the eliminators for supporting the vaporizer, a fan for drawing air through the casing, means for removably positioning the fan on the casing for permitting access to the interior of the casing, and means for operating the vaporizer independently of the fan.

3. An apparatus of the character described including in combination a casing defining a plurality of units each of said units embracing a reservoir, a pump cooperating with each of said reservoirs to produce a spray, a heater associated with one of said units only, said casing being formed with openings communicating with each of said units to permit flow of air through the spray produced by the pumps, said casing being provided with a space furnishing a mixing chamber for the air from both of said units and being further formed with an outlet common to both of said units, and means for forcing air through said outlet.

4. An air conditioning unit comprising a casing, openings in said casing to permit the circulation of air therethrough, means for circulating air through said casing, an atomizer within said casing, a truss positioned in said casing and comprising a central member with eliminators disposed on both sides thereof, said central member forming a motor support, a motor for driving said atomizer secured to said central member and a heater mounted by said casing above said motor and eliminators.

5. An air conditioner including, in combination, a casing defining a plurality of units each of said units embracing a reservoir, a pump cooperating with each of said reservoirs to produce a spray, said casing being formed with openings communicating with each of said units to permit flow of air through the spray produced by the pumps, said casing being provided with a space furnishing a mixing chamber for the air from both of said units and being further formed with an outlet common to both of said units, means for forcing air through said outlet and means for controlling the volume of spray produced by each of said units.

6. An air conditioning unit comprising in combination, a casing, a reservoir, inlet and outlet openings in said casing, a spray producing pump associated with said reservoir, a motor for driving said pump, eliminators disposed in said casing above said reservoir and between said inlet and outlet openings and a central truss member supporting said eliminators and pump motor and being adapted to form a spray protecting body for the latter.

In testimony whereof I affix my signature.

WALTER L. FLEISHER.